United States Patent
Haimer

(10) Patent No.: US 9,901,989 B2
(45) Date of Patent: *Feb. 27, 2018

(54) SCREW-IN TOOL AND TOOL HOLDER FOR SUCH A SCREW-IN TOOL

(71) Applicant: FRANZ HAIMER MASCHINENBAU KG, Igenhausen (DE)

(72) Inventor: Franz Haimer, Igenhausen (DE)

(73) Assignee: FRANZ HAIMER MASCHINENBAU KG, Igenhausen (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/376,738

(22) PCT Filed: Jan. 23, 2013

(86) PCT No.: PCT/EP2013/051243
§ 371 (c)(1),
(2) Date: Aug. 5, 2014

(87) PCT Pub. No.: WO2013/117431
PCT Pub. Date: Aug. 15, 2013

(65) Prior Publication Data
US 2015/0016905 A1    Jan. 15, 2015

(30) Foreign Application Priority Data
Feb. 7, 2012    (DE) .................. 10 2012 100 976

(51) Int. Cl.
*B23B 31/11*    (2006.01)
*B23C 5/10*    (2006.01)
*B23C 5/26*    (2006.01)

(52) U.S. Cl.
CPC ........ *B23B 31/1115* (2013.01); *B23C 5/1009* (2013.01); *B23C 5/26* (2013.01);
(Continued)

(58) Field of Classification Search
CPC ... B23B 31/11; B23B 31/107; B23B 31/1115; Y10T 279/16; Y10T 408/90993
See application file for complete search history.

(56) References Cited

U.S. PATENT DOCUMENTS

| 1,569,862 A | 1/1926 | Lapointe |
| 1,749,633 A | 3/1930 | Forberg |

(Continued)

FOREIGN PATENT DOCUMENTS

| DE | 3912503 A1 * | 3/1990 |
| DE | 3912503 A1 | 3/1990 |

(Continued)

OTHER PUBLICATIONS

Machine translation, German patent, DE 3912503 A1, "Interchangeable tool head clamping mechanism has cone angles on head greater by predetermined amount than on holder", Reinhardt, H., et al., Mar. 22, 1990.*

(Continued)

*Primary Examiner* — Eric A Gates
*Assistant Examiner* — Chwen-Wei Su
(74) *Attorney, Agent, or Firm* — Paul D. Bianco; Gary S. Winer; Fleit Gibbons Gutman Bongini & Bianco PL

(57) ABSTRACT

The invention relates to a screw-in tool (1) and to a tool holder (2) for such a screw-in tool. The screw-in tool (1) contains a tool head (3) and a tool shank (4) having an outer thread (5) and a supporting region arranged between the tool head (3) and the outer thread (5). According to the invention, the supporting region is formed by two conical bearing faces (6, 8) having different cone angles.

17 Claims, 5 Drawing Sheets

(52) U.S. Cl.
CPC ....... *B23B 2231/24* (2013.01); *B23B 2240/24* (2013.01); *B23B 2260/1381* (2013.01); *B23C 2210/02* (2013.01); *B23C 2240/32* (2013.01); *B23C 2250/12* (2013.01); *Y10T 279/16* (2015.01); *Y10T 408/45* (2015.01); *Y10T 408/89* (2015.01); *Y10T 408/90993* (2015.01); *Y10T 408/95* (2015.01)

(56) References Cited

U.S. PATENT DOCUMENTS

| | | | | |
|---|---|---|---|---|
| 2,060,889 | A | | 11/1936 | Nilsson |
| 2,079,692 | A | * | 5/1937 | Lapointe ............ B23B 31/1107 285/332.3 |
| 2,669,468 | A | * | 2/1954 | Clerke ................. F16L 15/001 215/329 |
| 3,087,360 | A | * | 4/1963 | Garberding ............ B23B 31/08 407/47 |
| 4,192,533 | A | * | 3/1980 | Blose .................... F16L 15/008 285/334 |
| 5,163,790 | A | * | 11/1992 | Vig ..................... B23B 31/1107 279/8 |
| 5,873,687 | A | | 2/1999 | Watanabe |
| 7,153,071 | B2 | * | 12/2006 | Blomberg ............... B23B 31/11 279/8 |
| 7,341,409 | B2 | | 3/2008 | Jonsson et al. |
| 7,374,376 | B2 | | 5/2008 | Jonsson et al. |
| 7,694,835 | B1 | * | 4/2010 | Montgomery ....... B65D 41/045 215/329 |
| 8,322,258 | B2 | * | 12/2012 | Haimer ................. B23B 31/02 407/67 |
| 8,690,500 | B2 | | 4/2014 | Spichtinger et al. |
| 2001/0041089 | A1 | | 11/2001 | Hecht |
| 2002/0021945 | A1 | | 2/2002 | Harpaz et al. |
| 2003/0143044 | A1 | * | 7/2003 | Rothenstein ............. B23C 5/10 408/233 |
| 2006/0072977 | A1 | | 4/2006 | Jonsson et al. |
| 2006/0073744 | A1 | | 4/2006 | Jonsson et al. |
| 2007/0104549 | A1 | | 5/2007 | Hecht et al. |
| 2007/0248421 | A1 | | 10/2007 | Kakai et al. |
| 2011/0081212 | A1 | | 4/2011 | Spichtinger et al. |
| 2012/0208147 | A1 | | 8/2012 | Krumsiek |
| 2013/0071196 | A1 | * | 3/2013 | Oettle .................. B23B 31/005 408/56 |
| 2014/0308082 | A1 | | 10/2014 | Abe et al. |
| 2014/0360334 | A1 | | 12/2014 | Singer-Schnoeller |

FOREIGN PATENT DOCUMENTS

| | | |
|---|---|---|
| DE | 102005012025 A1 | 12/2006 |
| DE | 102009048010 B3 | 2/2011 |
| DE | 102010028561 A1 | 11/2011 |
| FR | 1019411 A | 1/1953 |
| FR | 2602162 | 2/1988 |
| WO | 2006033616 A1 | 3/2006 |
| WO | 2006033617 A1 | 3/2006 |

OTHER PUBLICATIONS

Search Report with Written Opinion dated Aug. 4, 2015 from the Intellectual Property Office of Singapore.
Written Opinion published Aug. 7, 2014 for International Application No. PCT/EP2013/051243, filed Jan. 23, 2013.
Search Results of German patent application No. 10 2012 100 976.7, filed Feb. 7, 2012.
German Office Action dated Sep. 18, 2013 for Application No. 10 2012 100 976.7.
International Preliminary Report on Patentability dated Aug. 12, 2014 for International Application No. PCT/EP2013/051243, filed Jan. 23, 2013.
Written Opinion for PCT/EP2013/0521243, filed Jan. 23, 2013.
International Search Report for PCT/EP2013/0521243 dated Mar. 22, 2013.
Office Action in U.S. Appl. No. 14/672,407 dated Jan. 21, 2016.
Response dated Apr. 15, 2016 in U.S. Appl. No. 14/672,407.
Office Action dated May 10, 2016 in U.S. Appl. No. 14/672,407.
Interview Summary dated Aug. 12, 2016 in U.S. Appl. No. 14/672,407.
Response to Office Action dated Sep. 12, 2016 in U.S. Appl. No. 14/672,407.
Machine Translation of DE 10 2005 012025, Jul. 12, 2006.
Response to Office Action dated Jun. 14, 2017 for U.S. Appl. No. 14/672,407.
Interview Summary dated Jun. 5, 2017 for U.S. Appl. No. 14/672,407.
Final Rejection dated Mar. 14, 2017 for U.S. Appl. No. 14/672,407.
Response to Office Action dated Feb. 16, 2017 for U.S. Appl. No. 14/672,407.
Office Action dated Nov. 16, 2017 for U.S. Appl. No. 14/672,407.

* cited by examiner

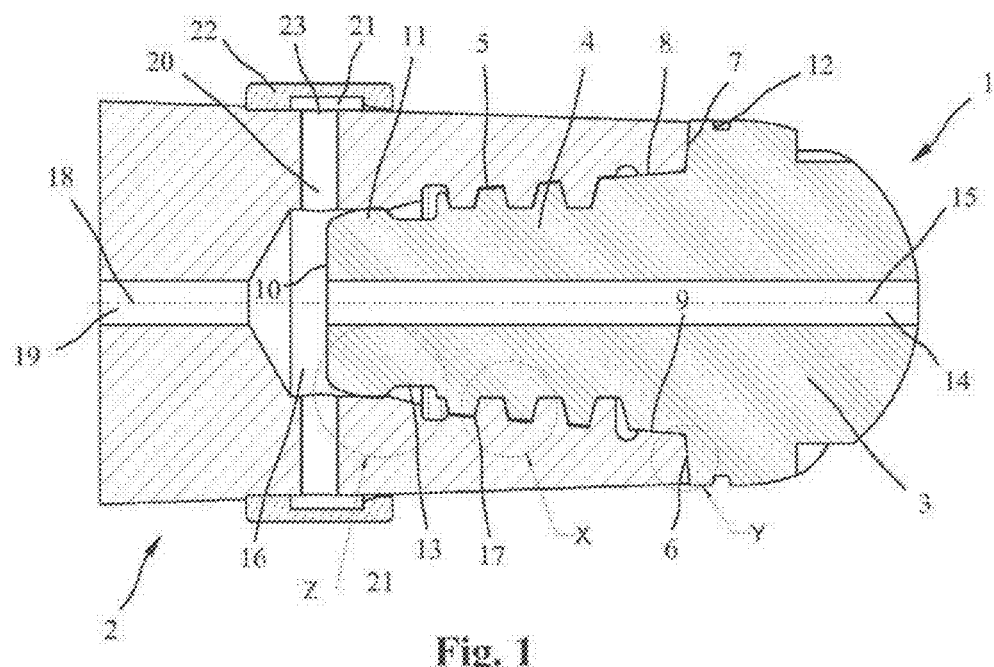
Fig. 1
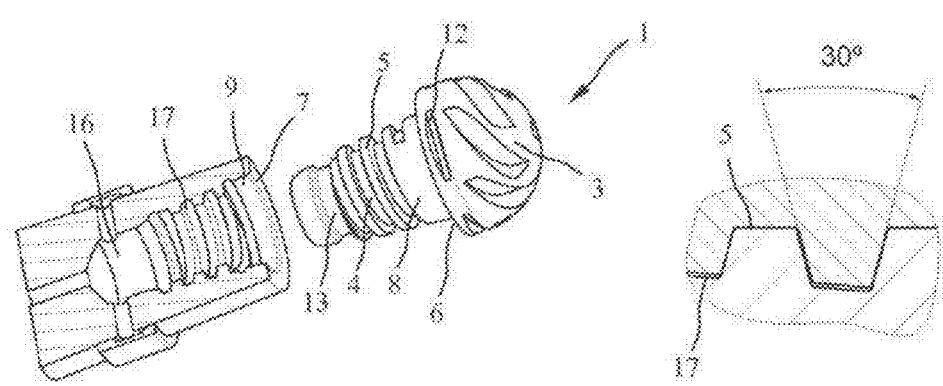
Fig. 2
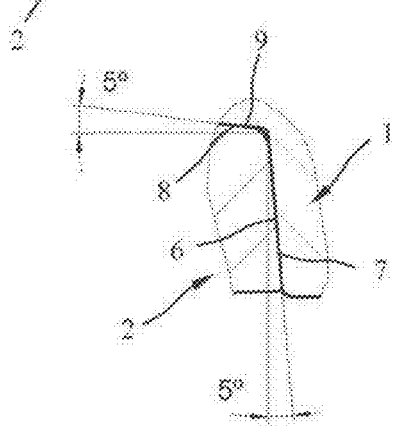
Fig. 3
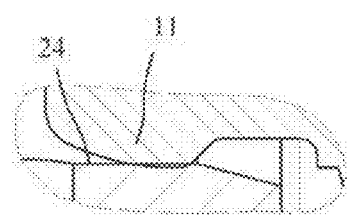
Fig. 4
Fig. 5

SCREW-IN TOOL AND TOOL HOLDER FOR SUCH A SCREW-IN TOOL

FIELD OF THE INVENTION

The invention concerns a screw-in tool. The invention also concerns a tool holder for such a screw-in tool and a tool arrangement with the screw-in tool and the tool holder.

BACKGROUND OF THE DISCLOSURE

From WO 2006/033617 A1, a screw-in tool is known, which contains a tool head and a tool shank with an outer thread, and a first supporting region situated between the tool head and the outer thread. In this known screw-in tool, the first supporting region is constructed either as a radial bond with a plane surface and a cylindrical inner bearing face or as a conical bearing face. In the first alternative, a precise axial positioning of the screw-in tool is attained within a holder via the plane surface of the radial bond; however, the centering effect via the cylindrical bearing face is limited. A better centering effect can be attained via the conical bearing face, but the outer wall of the tool holders can be deformed as a result of the wedge effect of the conical bearing face outward, which can have a negative effect on the axial alignment.

SUMMARY OF THE INVENTION

The goal of the invention is to create a screw-in tool, a tool holder for such a screw-in tool, and a tool arrangement with a tool holder and a screw-in tool that make possible an accurately positioned and reproducible holder and a mounting of a screw-in tool.

This goal is attained by a screw-in tool as disclosed herein, by a tool holder as disclosed herein, and by a tool arrangement as disclosed herein. Appropriate refinements and advantageous embodiments of the invention are also disclosed.

In the screw-in tool in accordance with the invention, the supporting region, situated between the tool head and the outer thread, is formed by two conical bearing faces with different cone angles. Also, with the tool holder belonging to the screw-in tool, the supporting region, situated between a front side of the tool holder and an inner thread, is formed by two conical contact surfaces with different cone angles. In this way, a supporting region with a double cone is created that provides an enlarged contact surface opposite a face contact or a straight bearing face, and makes an improved centering and supporting effect possible.

The first conical bearing face of the screw-in tool, adjacent to the tool head, and the corresponding first conical contact surface on the front side of the tool holder preferably have a relatively large cone angle. Here, a cone angle of 170° turned out to be favorable. In a preferred development, the second conical bearing face follows this contact surface on the screw-in tool and the corresponding second conical contact surface, the tool holder. This second bearing face and the corresponding second contact surface preferably have relatively small cone angles. Here, a cone angle of 10° has turned out to be favorable. However, it is also possible to provide, for example, an intermediate cylindrical area between the two conical surfaces. A double cone of the described type with different cone angles has the advantage that the small cone angle makes possible a good centering of the screw-in tool in the tool holder, and the large cone angle makes possible an additional centering but with greatly reduced spreading forces on the tool holder. In addition, the rigidity of the tool is increased by the first conical bearing face, since the tool cannot slide off with a radial load, as is the case with a plane bearing face.

For the orientation of the first conical bearing face and the corresponding first conical contact surface, two models are thereby possible. In a first preferred development, the diameters of these conical surfaces are reduced in the screwing direction of the tool, that is, the cones which underlie the two cone surfaces forming the double cone point in the same direction. In this embodiment, a slight spreading of the tool holder by the conical surfaces is possible. In comparison to a plane axial bearing face, the thread pretension rises less with the screwing angle and thus, a more exact adjustment of the pretension during the assembly of the screw-in tool is possible. Since the screw-in tools are mostly produced as a unit from very hard materials, the elastic deformation of the thread that is needed for the thread locking is largely restricted to the deformation of the inner thread of the tool holder. So as to have as long as possible a service life with such a tool holder, an exact adjustment of the thread pretention is therefore extremely important. With a double cone of the described type, an exact adjustment pretension is made possible because it can be adjusted better. In another possible development, the diameters of the first conical bearing face and the corresponding first conical contact surface increase in the screwing direction of the tool, that is, the cones that underlie the two conical surfaces forming the double cone point in the opposite directions. With such a development of the double cone, a spreading of the tool holder is counteracted, since the radial forces caused by the conical surface act in opposition. The special advantage of this development is that with the reduced spreading of the tool holder, a better conclusion regarding the screwing torque on the thread pretension is made possible and thus, a more exact adjustment of the thread pretension with the advantages described above.

In a further advantageous manner, another supporting region with a bearing area or with another contact area is provided on the free end of the tool shank, and correspondingly also on the inner end of the holder opening of the tool holder. This additional bearing area on the tool shank of the screw-in tool can, for example be designed spherical, whereas the other corresponding contact area on the tool holder can be made as a cylindrical contact surface. With the spherical bearing area and the cylindrical contact surface, an only partial contact is attained in this area between the screw-in tool and the tool holder. Appropriately, the additional spherical bearing area has an excess, in comparison to the cylindrical contact surface, so that the pretension in this additional supporting region is independent of the screwing depth. There are also, however, other conceivable developments of the additional supporting region. Thus, spherical, conical, or cylindrical bearing faces or contact surfaces can be provided on the tool and the tool holder in arbitrary combinations as well.

The outer thread on the screw-in tool and the corresponding inner thread on the tool holder appropriately have a thread depth that declines toward the free end of the tool shank or toward the inner end of the holder opening. The threads, however, can also have a constant thread depth.

For the outer thread and the corresponding inner thread, trapezoidal threads or flat threads have proved to be particularly appropriate. However, the threads can also be designed as conical threads, round threads, buttress threads, or the like.

In another advantageous development, a threaded insert is provided, which is inserted into the tool holder. This threaded insert can contain the contact surfaces of the first and second supporting regions and the thread, but also only a part of these elements. By selecting a suitable material for the threaded insert, a vibration dampening can be attained. Furthermore, the tool holder can also be produced from solid, but brittle, hard metal, and the threaded insert with the thread, from soft, but rather elastic steel, which is favorable for a secure locking of the screw connection. Moreover, the tool holder can be adapted by different threaded inserts for the holder of different configurations of tools. The threaded insert can consist of one part or of several parts, which can also be made of various materials.

In order to simplify the production of the screw-in tool, a gripper groove for the clamping of the screw-in tool can be provided on the tool shank. Pincer-shaped gripper elements of a clamping device, for example, for the clamping of the tool in the tool holder, can grip the gripper groove. The tool and the tool holder can be provided with an antirotation lock when clamping with the aid of the gripper groove.

The tool holder can be made, for example, of steel, hard metal, aluminum, or a fiber composite, in particular, glass or carbon fibers.

BRIEF DESCRIPTION OF THE DRAWINGS

Special features and qualities of the invention can be deduced from the following description of preferred embodiment examples with the aid of the drawings. The figures show the following:

FIG. 1, a tool holder and a screw-in tool in a longitudinal section;

FIG. 2, the tool holder and the screw-in tool of FIG. 1 in a perspective view;

FIG. 3, a detailed view X of FIG. 1;

FIG. 4, a detailed view Y of FIG. 1;

FIG. 5, a detailed view Z of FIG. 1;

DETAILED DESCRIPTION OF THE DISCLOSURE

Figure 6:
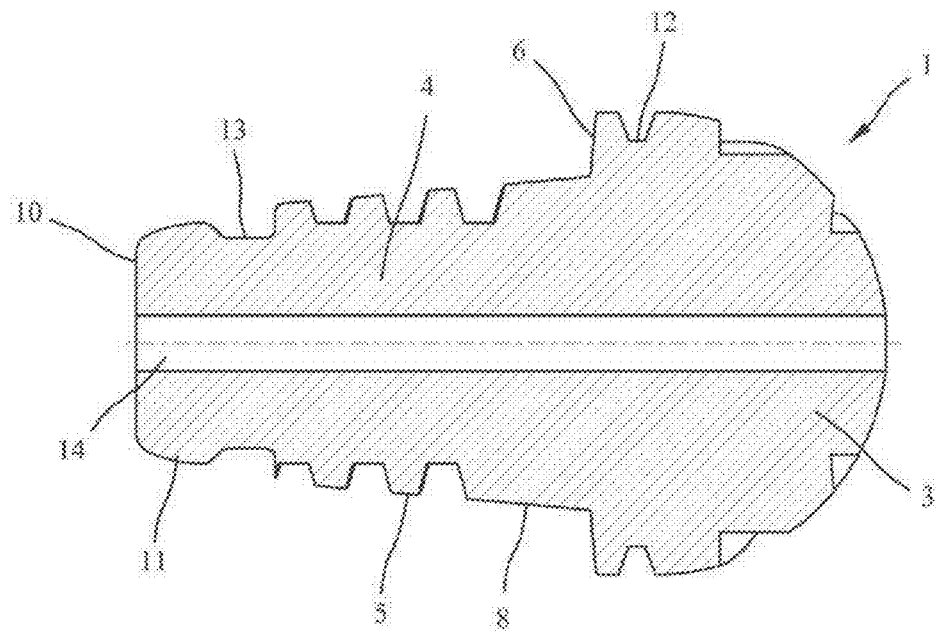
FIG. 6, a screw-in tool with a trapezoidal thread.
Figure 7:
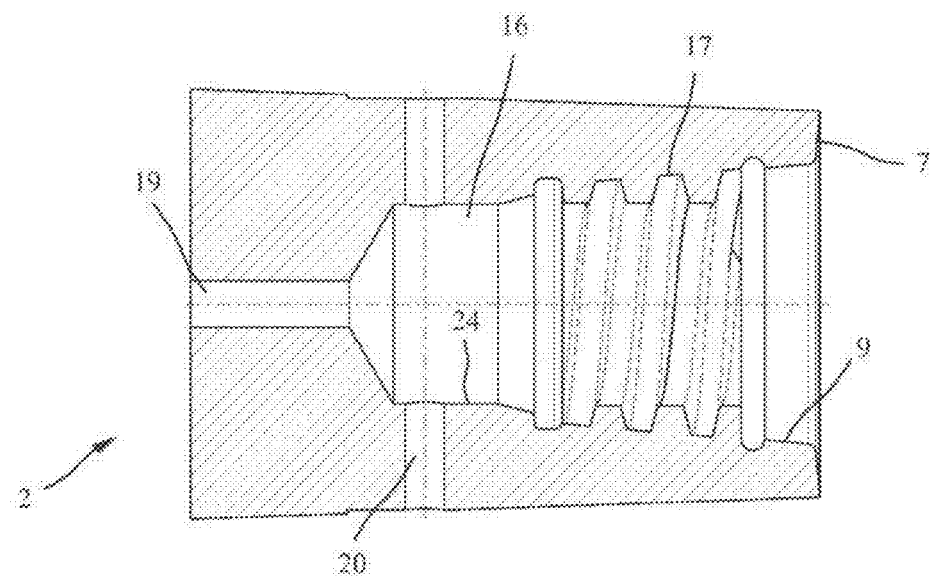
FIG. 7, a screw-in holder for a screw-in tool according to FIG. 6.

FIGS. 1 and 2 show a tool arrangement with a screw-in tool 1 and a corresponding tool holder 2 in a longitudinal section and a perspective view. The screw-in tool 1 has a tool head 3, which is designed here as a spherical-head cutter, and a tool shank 4, which tapers conically toward the rear, with an outer winding 5. A first supporting region with a first conical bearing face 6 is provided between the tool head 3 and the outer winding 5 for the placement on a counter-conical contact surface 7 on a front side of the tool holder 2, and a second conical bearing face 8 for the placement on a second conical contact surface 9 in the interior of the tool holder. In this way, a double cone, which ensures an improved centering and an increased supporting effect, is produced on the transition between the tool head 3 and the outer winding 5. A second supporting region 11 is found on a free rear end 10 of the tool shank 4.

As can be seen particularly from FIG. 2, the tool head 3 has, on its outside, several key surfaces 12 distributed over the circumference for the screwing in of the screw-in tool 1 into the tool holder 2. The key surfaces 12 can also be used for the automatic tool change in the cutter. There is also a gripper groove 13 in the rear area of the tool shank 4 for the automatic clamping of the screw-in tool 1 in the tool holder 2 between the rear end of the outer thread 5 and the second rear supporting region 11. Pincer-like gripper elements of a clamping device, for example, can grip into the gripper groove 13, so as to be able to securely grip or hold the screw-in tool 1 in the tool holder 2. A central passage opening 14, which can be seen in FIG. 1, also runs through the screw-in tool 1, and it is possible to conduct the cooling lubricant, the compressed air, or another work fluid through this passage opening to the processing area. The passage opening 14 is situated coaxial to the middle axis 15 of the screw-in tool 1, but other arrangements, for example, with genuinely parallel or angular longitudinal axes are also possible, however.

The tool holder 2 belonging to the screw-in tool 1 has a holder opening 16 with an inner thread 17. An outer supporting region with the first contact surface 7 for placement on the first bearing face 6 and with the second contact surface 9 for placement on the second bearing face 8 of the screw-in tool 1 is provided on the front side of the tool holder 2. A supply opening 19, coaxial to its middle axis 18, for the supply of a work fluid to the passage opening 14 of the screw-in tool 1 is also located in the tool holder 2, wherein here also, another arrangement comparable to the passage opening 14 is possible. Radial boreholes 20 can also be located in the tool holder 2; they open into the holder opening 16 or also into the supply 19. A sleeve 22, provided with an annular groove 21 on the inside for the outer cooling agent supply can be situated on the outside of the tool holder 2. The annular groove 21 can likewise, however, also be formed on the tool holder 2.

In the embodiment shown in FIGS. 1-7, the outer thread 5 of the screw-in tool 1 and the corresponding inner thread 17 of the tool holder 2 are constructed as a trapezoidal thread with a flank angle of 30°, shown in FIG. 3. The outer thread 5 of the screw-in tool 1 and the corresponding inner thread 17 of the tool holder 2 can, however, also be constructed as a trapezoidal thread with other flank angles. In contrast to the traditional threads, in which the thread turns have a constant thread depth, the outer thread 5 used here has a thread depth which declines from the tool head 3 toward the free rear end 10 of the tool shank 4. Also, with the inner thread 17 of the tool holder 2, the thread depth declines from the second contact surface 9 toward the second supporting region 11.

From FIG. 4, it can be seen that the first bearing face 6 of the screw-in tool 1 and the corresponding fist contact surface 7 of the tool holder 2 are inclined by 5° relative to a plane that is vertical with respect to the middle axes 15 and 18, in the direction of the front end of the tool head 3. In this way, the first conical bearing face 6 and also the first conical contact surface 7 have a cone angle of at least 140° and a maximum 179°, but preferably 170°. The diameter of the second conical bearing face 8 of the screw-in tool 1 and the diameter of the second conical contact surface 9 of the tool holder 2 taper in the screw-in direction, so that the result is a cone angle of at least 1° and a maximum of 90°, but preferably 10°, which means an angle of the cone surfaces of 5° relative to the middle axes 15 and 18.

The second supporting region 11 of the screw-in tool 1 is designed with a spherical shape in accordance with FIG. 5 and is placed on a cylindrical bearing face 24 at the end of the holder opening 16. The cylindrical bearing face 24 forms another inner bearing area in the tool holder. The spherical supporting region 11 ensures an only parallel contact between the screw-in tool 1 and the tool holder 2. Appropriately, the second spherical supporting region 11 has an excess in comparison to the cylindrical bearing face 24, so that the pretension in this second supporting region is independent of the screwing depth.

Figure 8:
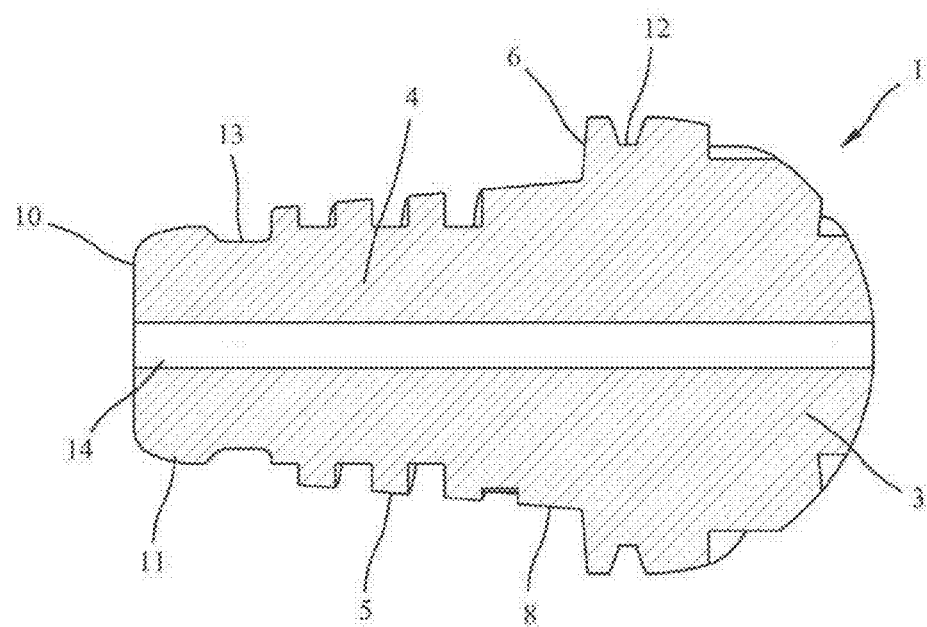
FIG. 8, a screw-in tool with a flat thread.
Figure 9:
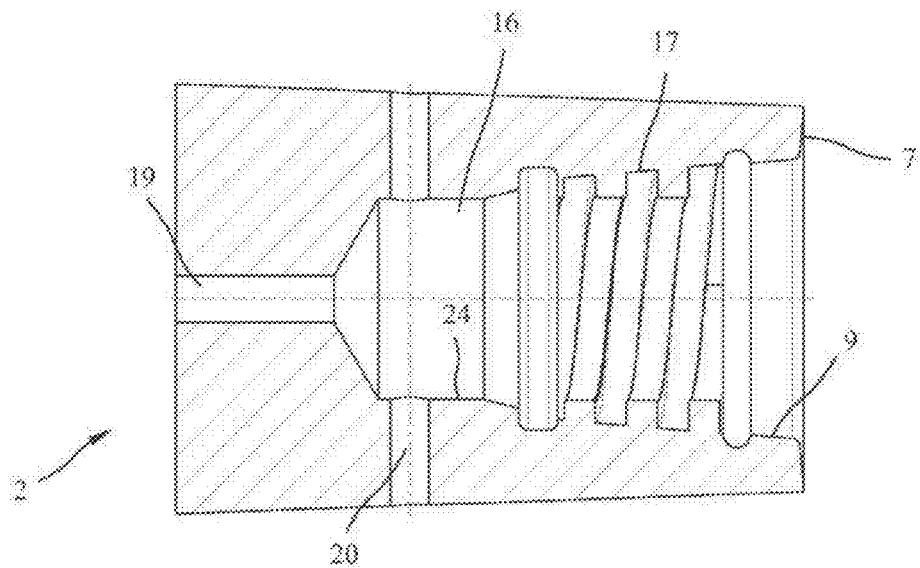
FIG. 9, a tool holder for a screw-in tool according to FIG. 8.

Another embodiment example of a screw-in tool 1 and a corresponding tool holder 2 is shown in FIGS. 8 and 9. In contrast to the embodiment of FIGS. 6 and 7, the outer thread 5 of the screw-in tool 1 and the inner thread 17 of the tool holder 2 are constructed as flat threads in this embodiment example. Otherwise, this embodiment corresponds to the previous embodiment example, so components that correspond to one another are also provided with the same reference symbols. In this embodiment also, the outer thread 5 used here has a thread depth that declines from the tool head 3 toward the free end 10 of the tool shank 4. Furthermore, here too, the thread depth declines from the second contact surface 9 toward the second supporting region 11 in the inner thread 17 of the tool holder 2.

Figure 10:
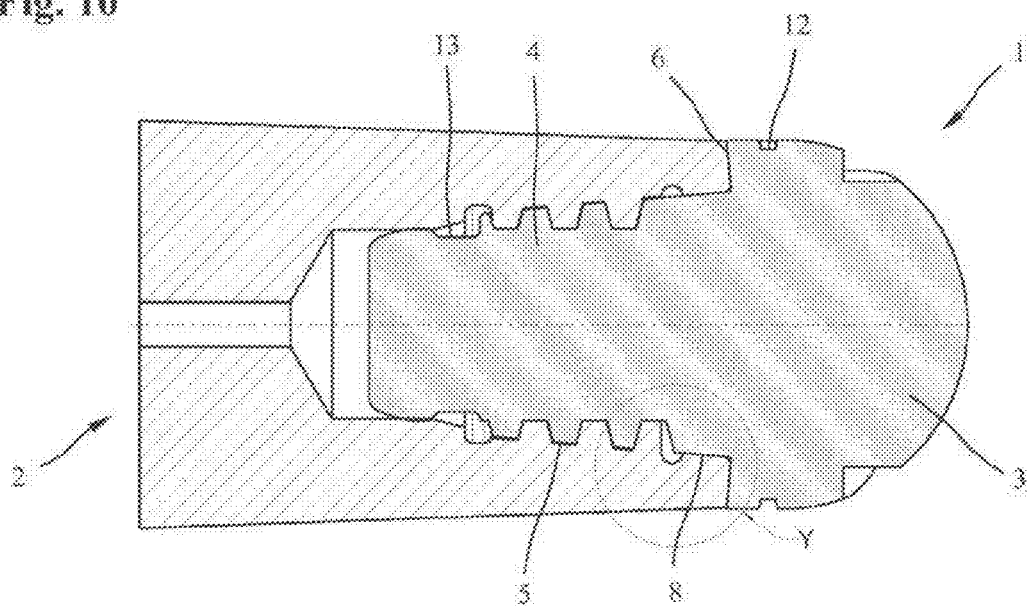
FIG. 10, another embodiment example of a screw-in tool with a trapezoidal thread.
Figure 11:
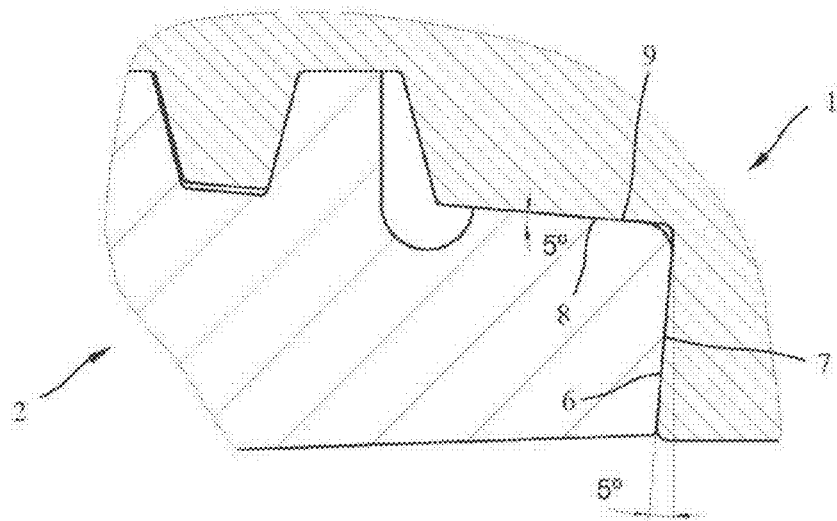
FIG. 11, an enlarged partial view Y of FIG. 10.

FIGS. 10 and 11 show an embodiment example in which the diameters of the conical first bearing face 6 of the screw-in tool 1 and the corresponding conical first contact surface 7 of the tool holder 2 expand in the screwing direction of the screw-in tool 1. The first bearing face 6 and the corresponding first contact surface 7 are inclined around 5°, relative to the plane, vertical to the middle axes 15 and 18, in the direction of the tool shank 4. In this way, the first conical bearing face 6 and also the first conical contact surface 7 have a cone angle of 170°, just as in the embodiment example from FIG. 4. The second conical bearing face 8 and the second conical contact surface 9 taper at an angle of 5° relative to the middle axes 15 and 18, so that a cone angle of 10° is produced. In contrast to the embodiments of FIGS. 1-9, the cones that underlie the two conical surfaces forming the double cone point in opposite directions.

Figure 12:
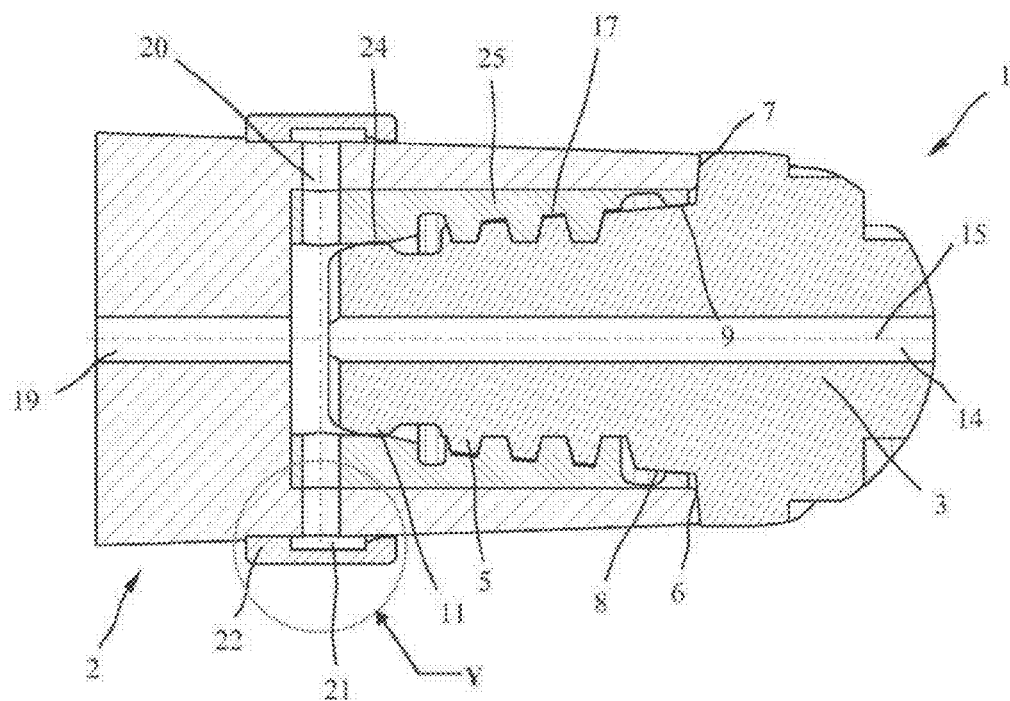
FIG. 12, another embodiment example of a tool holder and a screw-in tool in a longitudinal section.

FIG. 12 shows an embodiment example in which a threaded insert 25, which contains the second conical contact surface 9, the inner thread 17, and the cylindrical bearing face 24, is inserted into the holder opening 16 of the tool holder 2. The radial boreholes 20 go through the tool holder 2 and the threaded insert 25 and lead into the holder opening 16 of the tool holder 2.

Figure 13:
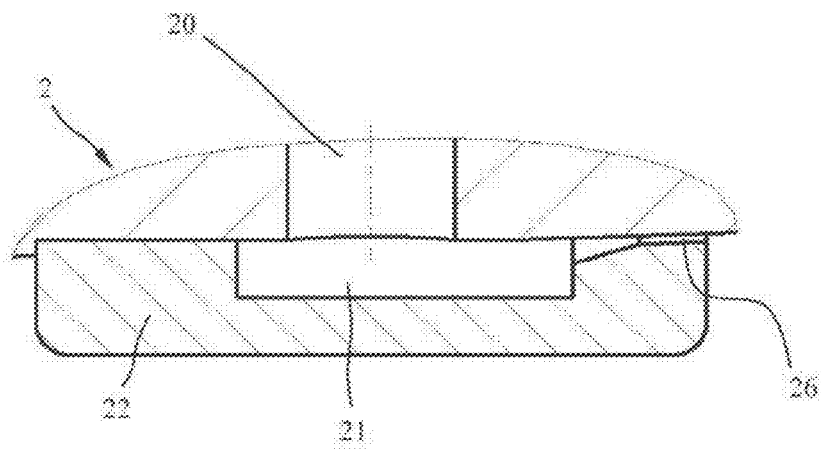
FIG. 13, an enlarged partial view Y of FIG. 12.

FIG. 13 shows an enlarged representation of the sleeve 22 for the outer cooling agent supply. In the direction of the tool, the sleeve 22 has one or more outlets 26, through which the cooling agent guided outward via the radial boreholes 20 and exiting through the outer openings 23 can be conducted to the tool or to the site to be processed. The exit(s) 26 can be designed as a surrounding slot, boreholes, slits, or the like.

The invention is not limited to the embodiment examples described in the preceding and shown in the drawing. Thus, for example, the outer cooling agent supply with the radial boreholes and the sleeve, the gripper groove for the automatic tension in a tool machine, the threaded insert, or also the embodiment of the tool holder made of fibrous composites with screw-in tools or tool holders can be used individually or in combination, in which only simple conical, cylindrical, or plane bearing or contact surfaces or other centering or guiding possibilities are used. These embodiments are not limited to screw-in tools or holders with a double cone.

The invention claimed is:

1. A tool connectable to a rotatable threaded holder, the tool comprising:
    a tool head having a work surface formed upon an end of the tool head, and a first conical bearing face formed upon the tool head adjacent the work surface; and
    a tool shank extending away from the tool head and having
        a peripheral surface defining an outer periphery of the shank,
        an outer thread formed upon the peripheral surface threadably engageable with the holder, and
        a second conical bearing face formed upon the shank and positioned along the peripheral surface,
        the first and second conical bearing faces each shaped to directly contact and mate with a respective conical bearing face of the holder,
        the first and second conical bearing faces define first and second cones, respectively, which are coaxial and have apexes which point in a same direction and which define cone angles, defined as an angle formed by bisecting a cone, the first cone forming a cone angle of 140° to 179°, and the second cone forming a cone angle of 1° to 90°.

2. The tool according to claim 1, wherein the first cone forms a cone angle of 170° and the second cone forms a cone angle of 10°.

3. The tool according to claim 1, wherein an additional bearing face is provided on the tool shank proximate an insertion end of the shank.

4. The tool according to claim 3, wherein the additional bearing face defines one of a spherical, cylindrical, or conical shape.

5. The tool according to claim 1, wherein the outer thread has a thread depth that declines toward a free end of the tool shank.

6. The tool according to claim 1, wherein the outer thread defines one of a trapezoidal, round, flat, or conical thread shape.

7. The tool according to claim 1, wherein a gripper groove for clamping of the tool is provided on the tool shank.

8. The tool of claim 1, further including:
    a holder sized to receive the tool shank, the holder including
        an opening with an inner thread, and
        a supporting region situated between a front side of the tool holder and the inner thread, the supporting region forming corresponding surfaces integrally formed upon the tool shank and including first and second conical bearing faces each having a surface which defines a cone having an apex which points towards a threading in a direction of the tool shank and which define cone angles that differ relative to each other.

9. The tool according to claim 8, wherein the first and second conical bearing faces of the tool holder are directly adjacent to one another.

10. The tool according to claim 8, wherein an inner bearing surface is provided at an inner end of the holder opening, the tool shank further including a sealing surface mateable with the inner bearing surface.

11. The tool according to claim 10, wherein the sealing surface of the tool shank has a larger diameter than the inner bearing surface of the tool holder thereby forming an interference fit with the tool holder when the tool shank is screwed into the tool holder.

12. The tool according to claim 8, further including a sleeve situated on an outside surface of the tool holder, forming a channel for deflection of a cooling liquid.

13. A tool assembly, comprising:
a tool insert including:
   a tool head having a work surface formed upon an end of the tool head, and a first conical bearing face formed upon the tool head adjacent the work surface; and
   a tool shank extending away from the tool head and having
      a peripheral surface defining an outer periphery of the shank,
      an outer thread integrally formed upon the peripheral surface threadably engageable with a tool holder, the tool shank and the outer thread thereby formed as one piece, and
      a second conical bearing face formed in the tool shank and positioned along the peripheral surface,
   the first and second conical bearing faces integrally formed upon the tool shank, each shaped to directly contact and mate with a respective corresponding conical bearing face of the holder without an intervening part,
   the first and second conical bearing faces define first and second cones, respectively, which are coaxial and have apexes which point in a same direction and which define cone angles, defined as an angle formed by bisecting a cone, of between 140° and 179° for the first conical bearing face and between 1° to 90° for the second conical bearing face; and
a tool holder including:
   an inner bore;
   an inner thread formed within the inner bore, the inner thread mateable with the outer thread of the tool shank; and
   a holder supporting region forming the respective conical bearing faces of the holder, which include two conical bearing faces each having a surface which defines a cone having an apex which points towards a threading in a direction of the tool shank.

14. The tool assembly of claim 13, wherein a first cone angle forms an angle of 5 to 10 degrees with respect to a plane transverse to a longitudinal axis of the tool insert, and a second cone angle forms an angle of 5 to 10 degrees relative to the longitudinal axis.

15. The tool assembly of claim 13, wherein the two conical bearing faces of the tool insert and the tool holder define cones each having an apex which point towards a threading in a direction of a tool shank, each bearing face thereby configured to center the tool shank with respect to the holder and to bear a load transmitted through the holder to the tool shank.

16. A tool holder for holding a tool insert, the tool holder comprising:
a body having a bore defining an inner end and an entry end and defining a longitudinal axis extending between the inner end and the entry end;
a first conical tool bearing face formed upon the body and positioned at the entry end and defining a cone angle, defined as an angle formed by bisecting a cone, of between 140 and 179 degrees;
a second conical tool bearing face formed within the bore and positioned closer to the inner end than the first conical tool bearing face and defining an angle of 1 to 90 degrees with respect to the longitudinal axis;
the first and second conical tool bearing faces thereby shaped to directly contact and mate with corresponding surfaces of a tool head, to thereby center the tool head with respect to the tool holder, and to bear a load transmitted through the tool holder to the tool head;
an inner thread formed within the bore adjacent to the second conical tool bearing face and engageable with threads of the tool insert;
a sealing surface located near the inner end;
at least one radial borehole extending between an exterior side surface of the body and the inner end of the bore; and
at least one channel for conducting a fluid to the inner end of the bore.

17. The tool holder of claim 16, wherein the first conical tool bearing face is angled between 5 and 10 degrees with respect to a plane transverse to the longitudinal axis, and the second conical tool bearing face is angled between 5 and 10 degrees relative to the longitudinal axis.

* * * * *